Jan. 7, 1930.    D. I. ROGERS    1,742,414
MACHINE FOR AND METHOD OF MAKING RADIATOR UNITS
Filed Jan. 7, 1925    5 Sheets-Sheet 3
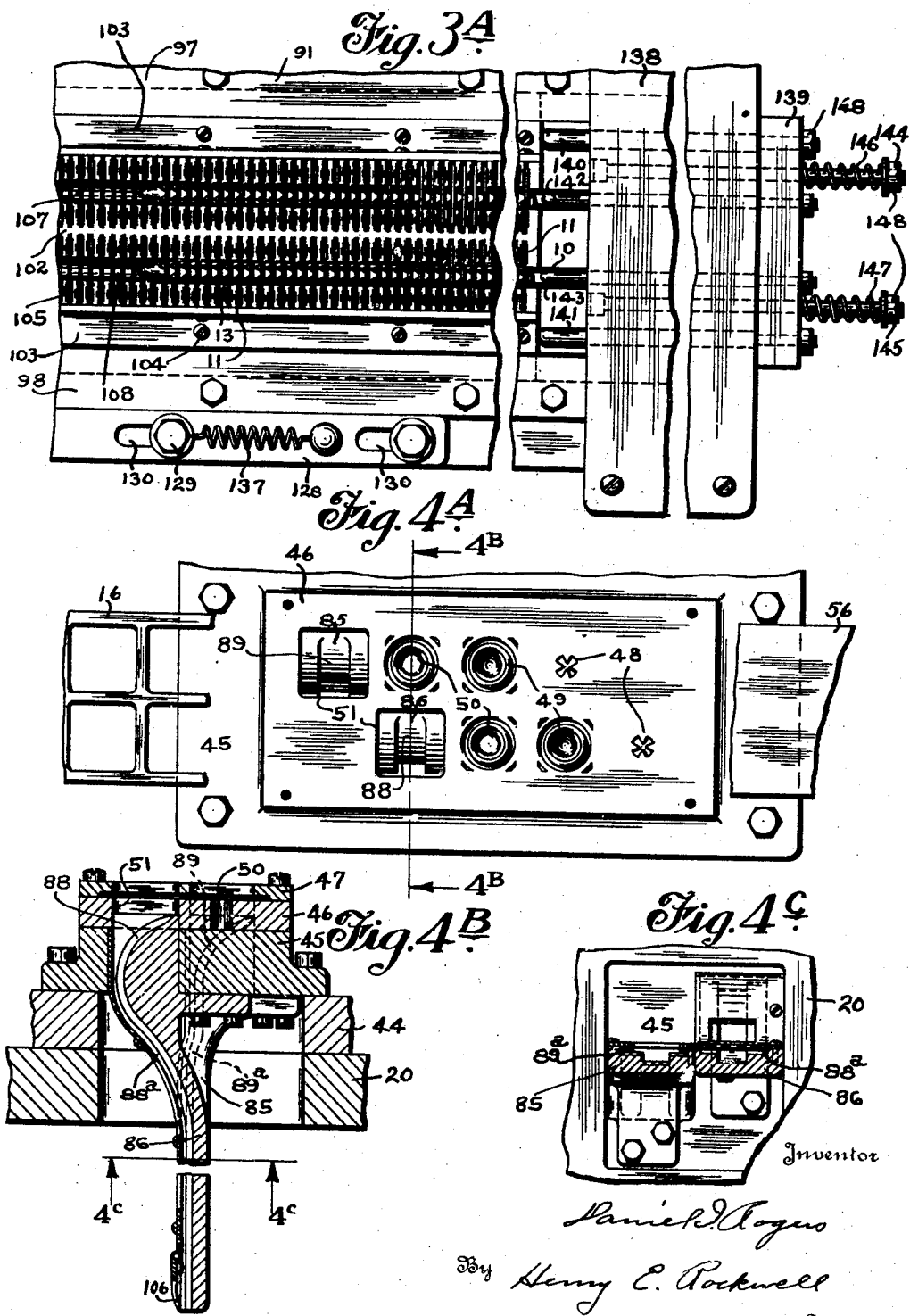

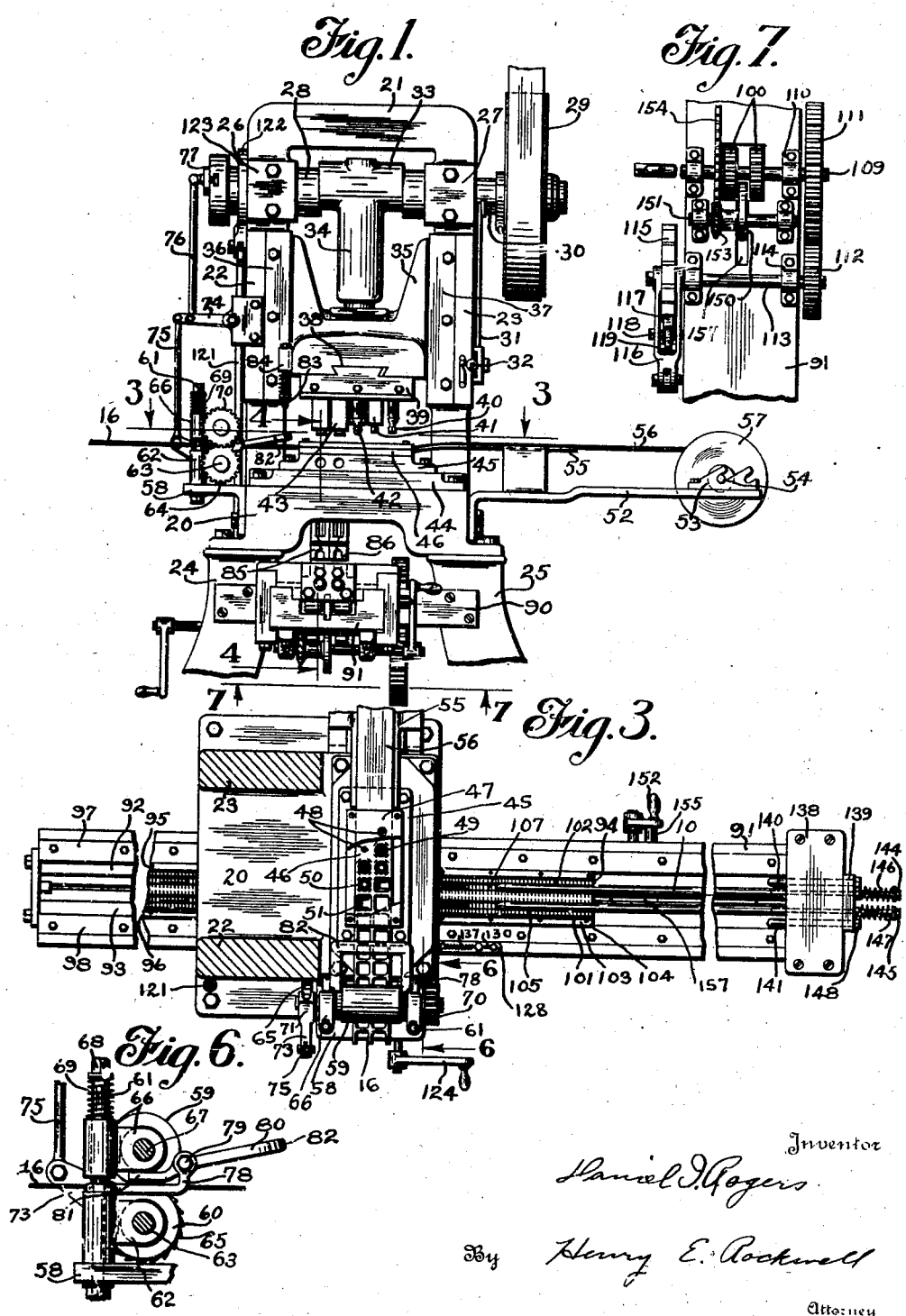

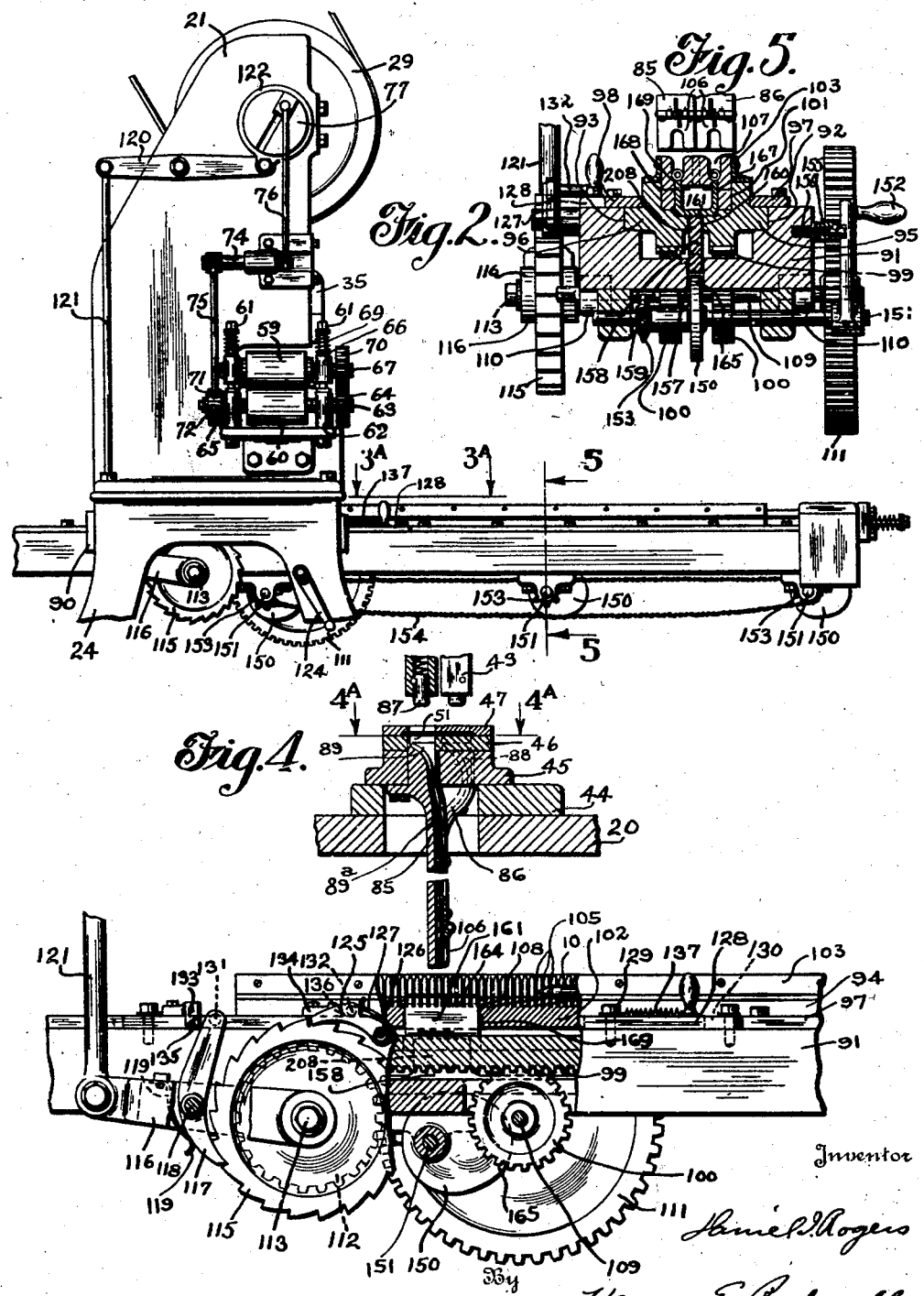

Jan. 7, 1930.　　　　　D. I. ROGERS　　　　　1,742,414
MACHINE FOR AND METHOD OF MAKING RADIATOR UNITS
Filed Jan. 7, 1925　　　5 Sheets-Sheet 4

Inventor
Daniel I. Rogers
By Henry E. Rockwell
Attorney

Jan. 7, 1930.  D. I. ROGERS  1,742,414
MACHINE FOR AND METHOD OF MAKING RADIATOR UNITS
Filed Jan. 7, 1925  5 Sheets-Sheet 5

Inventor
Daniel I. Rogers
By Henry E. Rockwell
Attorney

Patented Jan. 7, 1930

1,742,414

UNITED STATES PATENT OFFICE

DANIEL I. ROGERS, OF NEW HAVEN, CONNECTICUT, ASSIGNOR TO THE G & O MANUFACTURING COMPANY, OF NEW HAVEN, CONNECTICUT

MACHINE FOR AND METHOD OF MAKING RADIATOR UNITS

Application filed January 7, 1925. Serial No. 1,062.

This invention relates to the manufacture of the fin and tube type of radiators, wherein the top and bottom tanks of the radiator are connected by tubes upon which are evenly spaced fins. The tubes with evenly spaced fins assembled thereon are generally known as units, and it is to the manufacture of these units that this invention more especially applies, although similar structures for other uses may be made by the machine and method herein described and claimed.

Many difficulties have been encountered in the past in making these units. The fins being of thin metal are easily bent and are, therefore, hard to handle and to move about, after being fabricated, without considerable distortion. It has been the practice to place completed fins in a rack having evenly spaced pockets. This operation was done by hand. After being so racked, the fins were assembled upon a tube by forcing the tube through openings in the fins while they were so held in the rack. The tube and fins were then removed from the rack and dipped into a molten solder bath which permanently secured the fins to the tube. Occasionally omissions or errors in properly placing the fins in the rack would occur, necessitating either scrapping the entire tube and fins after soldering or of disassembling the parts and re-racking the fins. This work being practically all done by hand was expensive, and time-consuming.

The principal object of this invention is to overcome the above difficulties and therefore reduce the cost of manufacture of this type of radiator by the provision of an automatic machine which will supersede the hand operation of racking.

Another object of this invention is to provide a machine for fabricating fins or the like, in which the fins are automatically racked immediately after being fabricated and before removal from the machine.

Another object of the invention is to provide a machine wherein a plurality of fins may be fabricated substantially simultaneously and directed into a plurality of racks.

Another object of the invention is to provide a machine in which a tube is automatically forced through the fins after they have been racked.

Still another object of the invention is to provide a machine wherein a plurality of tubes may be forced through a series of racked fins or plates after the fins or plates have previously been fabricated and racked in evenly spaced relation.

Still another object of the invention is to provide a machine in which a tube is automatically forced through the fins, and in which, when the required number of fins are assembled upon the tube, the tube can be removed from the machine with the fins evenly spaced thereon.

A further object of the invention is the development of a method of making a radiator unit or the like, whereby fabricated elements are racked in spaced relation to each other and assembled upon a tube or series of tubes before removal from the fabricating machine.

To these and other ends, the invention consists in the novel features, combinations of parts and method employed to be hereinafter described and claimed.

Reference is made to the accompanying drawings, in which:

Fig. 1 is a front view of a machine embodying the features of my invention;

Fig. 2 is a side view of the same machine;

Fig. 3 is a top plan view of the machine looking in the direction of arrows 3—3 of Fig. 1; the upper portion of the machine being omitted for the sake of clearness;

Figure 8:
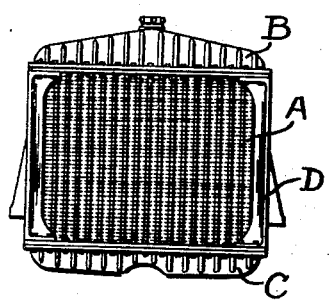
Figure 9:
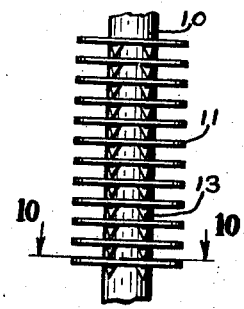
Figure 11:
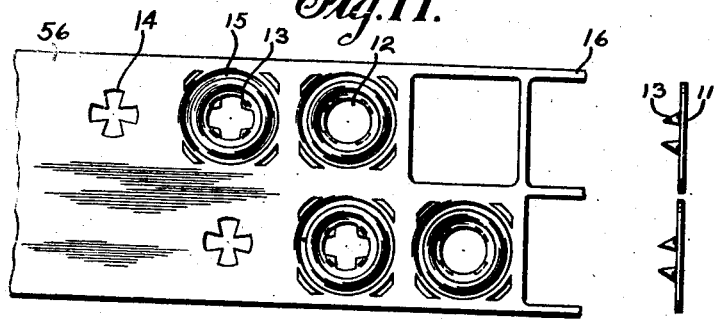
Figure 12:
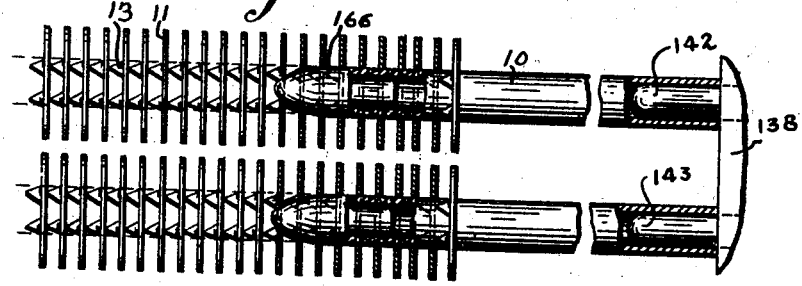
Figure 10:
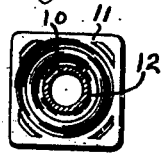
Figure 13:
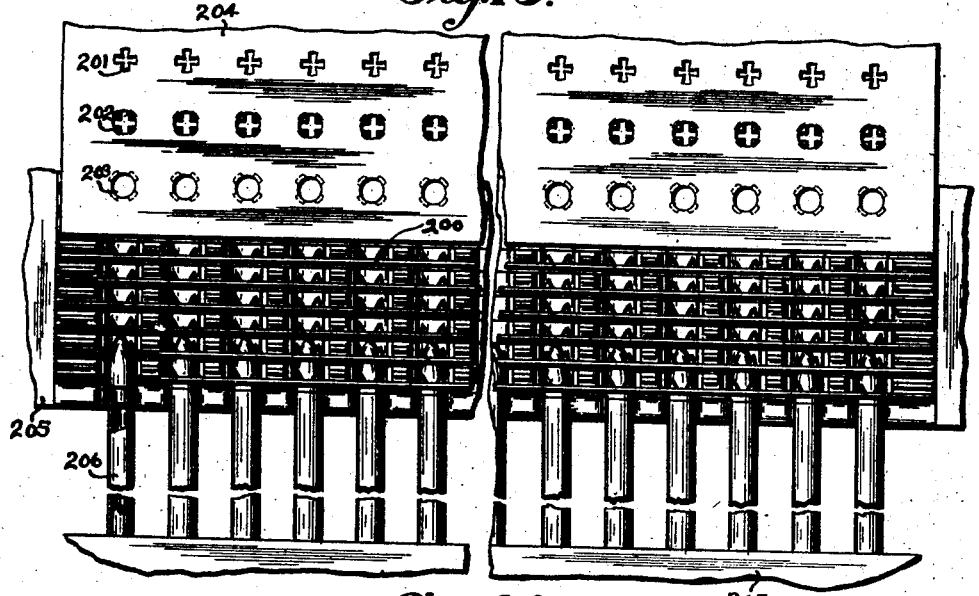
Figure 14:
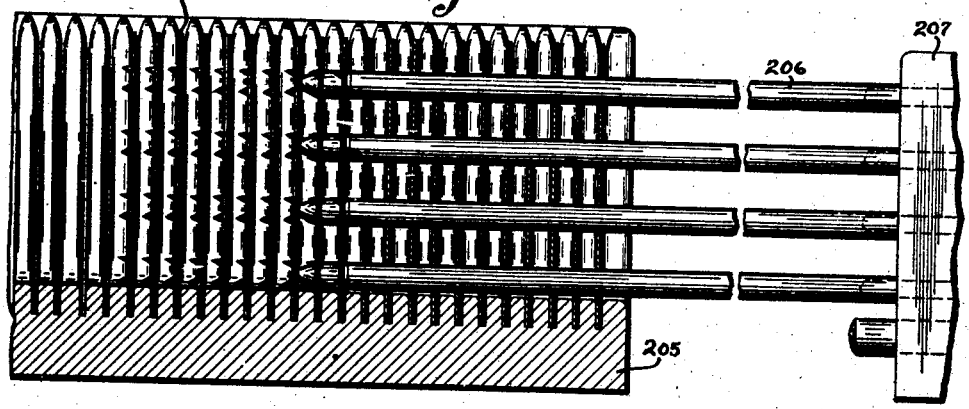
Figure 15:
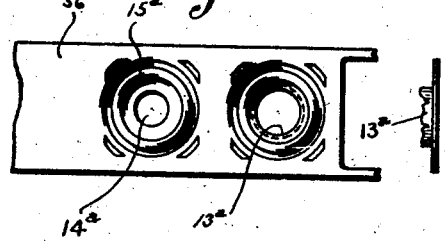

Fig. 3$^A$ is an enlarged plan view of a portion of the machine looking in the direction of arrows 3$^A$—3$^A$ of Fig. 2;

Fig. 4 is a partial section through the machine at line 4—4 of Fig. 1, certain parts not being shown in section in order to clearly show co-operation of the same with the parts in section;

Fig. 4$^A$ is an enlarged plan view of the fabricating dies, looking in the direction of the arrows 4$^A$—4$^A$ of Fig. 4;

Fig. 4$^B$ is a section on line 4$^B$—4$^B$ of Fig. 4$^A$;

Fig. 4$^C$ is a section on line 4$^C$—4$^C$ of Fig. 4$^B$;

Fig. 5 is a section on line 5—5 of Fig. 2;

Fig. 6 is a sectional view on line 6—6 of Fig. 3, of a portion of the machine;

Fig. 7 is a view looking in the direction of arrows 7—7 of Fig. 1, of the underside of the machine;

Fig. 8 is a front view of the radiator of the fin and tube type;

Fig. 9 is a portion of one unit;

Fig. 10 is a section on line 10—10 of Fig. 9;

Fig. 11 is a view of a strip of material from which a fin or element is in the process of being fabricated;

Fig. 12 is a composite view of a plurality of series of such fins on edge, into which a plurality of tubes are being pressed;

Fig. 13 is a view of a modified form of radiator fin or plate in the process of fabrication, racking and assembly upon a plurality of tubes;

Fig. 14 is a longitudinal section of the parts shown in Fig. 13, and,

Fig. 15 is a view of a portion of a strip from which a further modified form of fin is being fabricated, with an edge view of a completed fin.

The machine selected to illustrate my invention consists generally of a combination of means to fabricate the fins or plates, means to rack the fins when fabricated and means to assemble the fins upon a tube. The machine illustrated comprises a base 20, having a frame 21, with two vertical standards 22 and 23 mounted thereon. The base 20 is supported a suitable distance from the floor by standards or legs 24 and 25. The vertical standards 22 and 23 are provided with journal boxes 26 and 27, respectively, in which is journaled a crank shaft 28. A power driven fly wheel 29 is loosely mounted upon one end of the shaft 28 and is connectible thereto by a sliding key 30, which is operable in the usual manner by the lever 31 and handle 32. When so connected, the power driven fly wheel transmits power to the crank portion 33 of the shaft and through a pitman 34 to a reciprocating gate 35. The gate 35 is guided in its reciprocating movements in ways 36 and 37, mounted upon the vertical standards 22 and 23, respectively. The gate 35 is provided at its lower surface with a dove-tailed groove 38 by which the tool or punch block 39 may be secured thereto.

A plurality of series of tools used in the fabrication of a fin or element of a radiator unit, is mounted upon the punch block 39. These tools comprise a pair of hole punches 40, a pair of forming punches 41, a pair of flange punches 42 and a pair of blanking punches 43. It will be noted that in this particular machine two sets of such tools are provided and that one set is one space or step in advance of the other, but it is not intended that this invention be limited to two sets of tools as an operative machine would, of course, be possible having only one set or more than two sets.

Beneath the punch block 39, and mounted directly upon the base 20, is a die block plate 44, upon which is mounted a die block 45, a multiple die 46 and a stripper plate 47. The multiple die 46 consists of a series of proper dies positioned to co-operate with the aforesaid punches and comprises a pair of hole dies 48, a pair of form dies 49, a pair of flange dies 50 and a pair of blanking dies 51.

Extending outwardly to the right of the base 20 and secured thereto is a bracket 52 upon which, at 53, is journaled a shaft 54. Secured upon the bracket 52 is a guiding plate 55 which supports a blank strip of material 56 as it unwinds from a spool 57 rotatively mounted upon the shaft 54.

Secured by bolts 61 to a bracket 58 bolted to the base 20 at the left thereof is a pair of journals 62 forming bearings for a shaft 63 upon which is mounted a roll 60. The shaft 63 extends outwardly beyond the journals and at one end has a gear 64 keyed thereto. At the other end of this shaft a ratchet wheel 65 is secured. Upon the same pair of bolts above the journals 62 another pair of journals 66 are slidably mounted which form bearings for a shaft 67 upon which is mounted a roll 59. Above the journals 66 and acting between the top surfaces thereof and the bolt heads 68 is a pair of compression springs 69, which at all times urge the journals 66 downwardly, tending to insure contact between the rolls 59 and 60. The shaft 67 is extended outwardly beyond one of the journals 66 and has a gear 70 keyed thereto, which meshes with and thereby secures motion from gear 64. Mounted upon the shaft 63 is a pawl bracket 71, in which is pivoted a suitable pawl 72. The pawl 72 co-operates with the ratchet wheel 65 to impart motion thereto and thence to the shaft 63. An outwardly extending arm 73 of the pawl bracket is connected to an end of a rocking shaft 74, by means of a link 75. The other end of the rocking shaft 74 is connected by means of a link 76 to an adjustable eccentric 77, mounted upon an end of a crank shaft 28. A pair of supporting brackets 78 is mounted upon the bolts 61 between the journals 62 and 66 and extend outwardly therefrom toward the gate 35. Between these brackets and pivoted to them at 79 is a roll lifter 80 having a pair of arms 81 extending under the journals 66. These arms also extend in the other direction beyond the pivot point 79 and are connected together by a cross bar 82. A spring plunger 83, connected to a lug 84, upon the gate 35, is located to engage the bar 82 at each downward stroke of the gate whereby the roll 59 is lifted and pressure is released from the strip of material 56, being acted upon by the rolls 59 and 60, thereby retarding the movement of the strip during the interval that the punches and dies are performing their operation thereon.

A radiator of the fin and tube type is shown in Fig. 8. A plurality of units A extend from the top tank B to the bottom tank C, between the side frames D. A portion of one of these units is shown in Fig. 9 and comprises a water tube 10, having a plurality of fins 11 secured thereon. The fins in this case are in the form of a square and have a central opening 12 through which the tube 10 is pressed in a manner to be hereinafter explained. Ears 13 located about the opening 12 of the fins are provided, which project downwardly from one surface of the fins and along the tube, presenting sufficient surface in contact therewith for proper support thereon.

In Fig. 11, a portion of the strip 56 is shown after having been operated upon by the several punches and dies. The hole punch 40 and die 48 pierce the metal and form the opening 14. The forming punch 41 and die 49 then stamp the surface contour 15. The flange punch 42 and die 50 then act upon the strip and press out the ears 13 thus creating the opening 12, and the blanking punch 43 and die 51 shear the completely formed fin 11 from the strip, leaving a perforated strip of scrap material, as shown at 16, Figs. 4ᴬ and 11.

The pair of chutes 85 and 86 are secured to the under side of the die block 45 with a portion thereof extending into the opening of the blanking die 51. These chutes are arranged to catch the completed fins 11 and guide the same downwardly away from the die. Due to the contour of the interior at the mouth of these chutes, as shown at 88 and 89, each completed fin is turned from the horizontal plane in which it was fabricated to a vertical plane during its travel downwardly. The chutes are also arranged to guide the fins toward each other through guideways 88ᵃ and 89ᵃ, so that at the completion of their downward travel the fins stand vertically side by side in horizontal alignment. Spring pressed strippers or pins 87 in the punches 43 strip the completed fins out of engagement with the die and are arranged to assist in turning the fins and to urge them downwardly through the chutes. The lower ends of the chutes are provided with spring controlled swinging covers 106, which open outwardly to release the fins in case one of them becomes caught.

I have now fully described the fabricating means, which includes the cooperating punches and dies, with the driving means for the same and the intermittent strip feeding mechanism. The collecting and assembling mechanisms will now be considered and described.

Beneath the base 20 and hung by suitable supports 90 upon the standards or legs 24 and 25 is a frame 91, which extends outwardly from the base 20 at both the front and rear of the machine, at right angles to the direction the strip of material 56 is fed. The frame 91 is provided longitudinally thereof with guideways 92 and 93, in which, side extensions 95 and 96 of a reciprocating rack holder 94 are retained by plates 97 and 98. The rack holder 94 is provided along its bottom surface with rack teeth 99, which mesh with a pair of gears 100, by which the rack holder is reciprocated. A suitably formed groove 101 is provided along the upper surface of the holder 94 in which is mounted a pocketed rack 102 by means of suitable securing devices, such as strips of angle iron 103 and screws 104. The pocketed rack 102 is provided with evenly spaced pockets 105, in this particular machine there being two series of such pockets into which the completed fins are fed from the chutes 85 and 86. A groove 107, located centrally of the pockets and running longitudinally of the rack, forms shoulders 108 upon which the ears 13 of the fins 11 rest and which, therefore, support the fins in proper position with the central openings 12 in alignment with the tube 10.

The gears 100 are keyed to a shaft 109 journaled in suitable bearings 110 which may be integral with or secured to the frame 91. The shaft 109 extends outwardly beyond the frame at both sides thereof, and a gear 111 is keyed to one of these extensions. The gear 111 meshes with the gear 112. The gear 112 is keyed to a shaft 113, which is journaled in suitable bearings 114 and extends across the frame 91, beyond the other side thereof, and has a ratchet wheel 115 keyed thereon. A pawl bracket or arm 116 is rockably mounted upon the shaft 113, and has pivoted thereto, at 118, a driving or operating pawl 117. The pawl 117 is urged inwardly into engagement with the teeth of the ratchet wheel 115 by a spring 119. The outer end of the pawl arm 116 is connected to one end of a rocker arm 120 by a link member 121. The other end of the rocker arm is connected to a ring 122 which is mounted upon an eccentric portion formed upon the crank shaft 28 at 123. A locking pawl 125 is also provided to act upon the teeth of the ratchet wheel 115. This pawl is pivoted to the frame 91 at 126 and is urged into engagement with the teeth of the ratchet wheel by a spring 127. The locking pawl 125 acts as a stop for the ratchet wheel by not allowing the wheel to back up when the operating pawl 117 is raised for another stroke and also, through the ratchet wheel, resists any backward movement of the gearing or of the rack holder. Thus it is to be noted that when the crank shaft 28 is rotated the rocker arm 120 transmits power to the pawl arm 116, which through the operating pawl 117, operating upon the ratchet wheel 115, intermittently rotates the gears 111, 112 and 100, thereby intermittently moving the rack holder and the pocketed rack from the rear toward the front of the machine. This mechanism is arranged to advance the rack 102 a distance equal to one space or pocket at a time, so that, as the fabricated fins feed through the chutes, an empty pocket of the rack will be presented ready to receive a fin. The rack holder and rack may be retracted or returned to the rear of the machine by manually turning a handle 124, which is detachably secured upon one end of the shaft 109. Before such movement can take place, however, the operating pawl 117 and the locking pawl 125 must be disengaged from the ratchet wheel 115. This is accomplished by the use of the sliding bar 128 which is mounted upon the frame 91 by bolts 129 passing through elongated holes 130 in the bar. Secured to this bar in proper position to engage pins or lugs 131 and 132, protruding from the pawls 117 and 125 respectively, is a pair of blocks 133 and 134. These blocks are provided with cam surfaces 135 and 136, respectively, which act upon the pins and raise the pawls out of engagement with the ratchet wheel. A spring 137 returns the sliding bar when released by the operator, whereby the pawls are released and return into engagement with the ratchet wheel due to the action of their respective springs.

The frame 91 is provided at the front end with a block 138 to which is slidably secured a plate 139. Two guide rods 140 and 141 are securely bolted to the plate 139 and extend through the block 138. Other rods 142 and 143, also securely bolted to the plate 139, pass through the block 138 and are in alignment with the longitudinally extending grooves 107 of the pocketed rack 102. The rods 142 and 143 extend inwardly beyond the inner surface of the block 138 and form supports for one end of the tubes 10. Bolts 144 and 145 pass through both the block 138 and plate 139 and extend outwardly from the outer face of the plate 139. These bolts are provided with suitable springs 146 and 147 which abut the nuts 148 and react against the plate 139 whereby the plate is urged toward the block 138. In this way, the rods 142 and 143 are normally held protruding from the inner surface of the block 138. The rods 140 and 141 protrude slightly further from the inner surface of the block than do the rods 142 and 143, and are located in such a position that they are engaged by the end of the rack holder 94, when the said holder has nearly reached its forward limit of travel. Further movement forward of the rack holder will, therefore, press the rods 140 and 141 outwardly which will force the plate 139 away from the block 138 and thereby withdraw the rods 142 and 143 from the ends of the tubes 10 supported thereby.

After having assembled the desired number of fins upon a tube, it is desirable to remove the tube with the fins so assembled from the rack. This is accomplished by providing the machine illustrated with a plurality of cams 150, mounted upon shafts 151, spaced at intervals beneath the forward portion of the frame 91. One of the shafts 151, in this instance the central one, extends outwardly beyond the side of the frame and has a handle 152 mounted thereon. Secured to all of the shafts are sprocket wheels 153 inter-connected by a chain 154. Upon rotating the handle 152, all of the cams are rotated simultaneously. A spring pin 155, mounted in any suitable manner upon the frame 91, as at 156, allows the handle to rotate in one direction only. The cams 150 operate through openings 157 in the frame 91 where the eccentric portion 165 of each cam engages a bar 158 which lies in a groove 159 in the frame 91, extending longitudinally thereof. The bar 158 is provided with upstanding lugs 208 at intervals along its length. These lugs extend upwardly through openings 160 in the rack holder 94 and engage U shaped members 161. The U shaped members 161 ride in suitable openings 167 provided in the rack 102 with their leg portions 168 extending upwardly through slots 169 into the grooves 107. The leg portions 168 are slotted crosswise to match with the pockets of the rack, as shown at 164, Fig. 4, so that the fins will be properly held in the rack at the various points where these members 161 are located. The upper edges of the legs 168, therefore, engage the tubes 10 to raise the assembled tube and fins sufficiently to clear them from the rack, when the cams are rotated so that their eccentric portion 165 acts upon the bar 158.

The operation of the machine is as follows:

A strip of material 56 is threaded crosswise of the machine over the supporting plate 55 and between the stripper plate 47 and the multiple die 46, as far as the first or hole punch 40. Power is then applied by connecting the crank shaft 28 to the fly wheel 29 by means of the sliding key 30. The strip 56 is fed across the dies by hand during the first few strokes of the gate 35, until sufficient scrap as at 16 is formed to reach and be inserted between the rolls 59 and 60. From then on, these rolls, as above explained, pull the strip along intermittently at each stroke of the gate. Meanwhile, the rack 102, which was previously returned to its rearward position, is being filled with the completed fins which pass from the blanking die downwardly through the chutes. The rack 102, like the strip, is intermittently advanced in timed relation thereto. Tubes 10 previously placed upon the rods 142 and 143 rest in the longitudinal grooves 107. As the rack advances with the completed fins these tubes are pressed through the central openings 12 of the fins 11, the tubes being provided with pointed end members 166, as shown in Fig. 12, to insure their entering the openings 12 without distorting the fins. When the required number of fins have been assembled upon the tube and the rack is advanced to its forward limit, the rods 142 and 143 are withdrawn from the tubes as previously explained. The power is then shut off and the handle 152 is rotated and the assembled tubes and fins are raised from the rack and removed to a molten solder bath where they are permanently secured together. The empty racks are now returned to their rearward position by the means previously explained, and the machine is again operated as above.

Figs. 13 and 14 represent the manufacture of a somewhat modified form of radiator unit. In these figures the part corresponding to the fins 11 is in the form of a continuous plate 200 of proper length to extend from one side of the radiator core to the other and of sufficient width to extend from the front to the rear of the radiator core. Each plate while still connected with the strip of material 204 is acted upon by a plurality of similar punches and dies which produce openings in the plate, as shown at 201, 202 and 203, which are similar to the opening 12 of the fins 11, except that the irregular surface form 15 is omitted. After these openings are punched in the strip, plate 200 is sheared therefrom and is guided through a chute similar to 85 into a rack 205, operated and controlled the same as rack 102 previously described. A plurality of tubes 206 are held against an end block 207 in the same or similar manner as the tubes 10 above, and by the same means are pressed into the openings 203 of the plate 200. After a sufficient number of these plates have been fabricated, racked and assembled upon the tubes, the complete assembly is removed from the rack and dipped in solder. From this arrangement and series of operations a complete radiator core is assembled. This type of core is somewhat similar to the standard Ford radiator.

Fig. 15 represents a portion of a strip of material 56ª from which, by means of somewhat differently arranged tools, a fin of somewhat modified form is fabricated. In this instance, the contour 15ª upon the surface of the fin is formed at the same instant that an opening 14ª is made therein. The material about the opening at the next stroke of the press is acted upon by an expanding punch, which forms the flange 13ª which is used for the same purpose as the ears 13 in the above described form of fin. By this method, one of the steps in the fabrication of the fin is omitted as a separate operation and forms a part of what was a subsequent one. This method reduces the time required to produce a completed fin and the expense of an additional tool.

Various changes may be made in the details and combinations of such in the construction of a machine as above described and various departures may be made from the above described steps in the method of making a radiator unit or the complete core of a radiator, without departing from the scope of the invention as defined in the appended claims.

What I claim is:

1. A machine for making radiator units, comprising means to fabricate an element of said unit, means to receive a plurality of said elements one at a time from said fabricating means and means to move another element of said unit into assembled relation with the plurality of elements, while said elements are retained in said receiving means.

2. A machine for making radiator units, comprising means to fabricate an element of said unit, means to receive a plurality of said elements one at a time from said fabricating means and to retain the same in spaced relation to each other, means to assemble said elements on to another element of said unit while so retained, and means for removing the unit when so assembled from the receiving and retaining means.

3. A machine for making radiator elements, comprising means to fabricate a plurality of elements from a strip of blank material, means adapted to receive a plurality of said elements, means to guide the elements from the fabricating means to said receiving means, and means to force said elements on to another element while held in said receiving means.

4. A machine for making radiator units, comprising means to fabricate a plurality of similar elements of said units, means to selectively collect said elements from said fabricating means and to guide and arrange them in groups in which they are in alignment with each other, and means to receive the elements from said collecting and guiding means.

5. A machine for making radiator units, comprising means to fabricate a plurality of similar elements of said units, each of said elements having an opening therethrough, means to selectively collect said elements from said fabricating means and to guide them toward a position in which they are in alignment with each other, and means to thread a member through the opening in each of said elements.

6. A machine for making radiator units, comprising means to fabricate a plurality of similar elements of said units, each of said elements having an opening therethrough, means to selectively collect said elements from said fabricating means and to guide them singly toward a position in which they are in alignment with each other, and means to thread a member through the opening in each of said elements as the same are positioned in alignment and to retain them in such aligned position.

7. A machine for making radiator units, comprising means to fabricate a plurality of similar elements of said units, means to selectively collect said elements from said fabricating means and to guide them singly toward a position in which they are in alignment with each other, means to receive the elements from said collecting and guiding means and means to hold another radiator element, said receiving means being adapted to move said elements toward radiator element to assemble said elements together.

8. A machine for making radiator units, comprising means to fabricate a plurality of similar elements of said units, means to selectively collect said elements from said fabricating means and to guide them singly toward a position in which they are in alignment with each other, means to receive the elements from said collecting and guiding means and means to hold another radiator element, said receiving means being adapted to move said elements toward another radiator element to assemble said elements together and form a radiator unit, and means for removing the assembled unit from the receiving means.

9. A machine for making radiator units, comprising means to fabricate an element having a plurality of openings from a blank strip of material, means to receive a plurality of such elements from said fabricating means and to hold them in spaced relation relative to each other and means to hold a plurality of tubes, said receiving means adapted to move said plurality of spaced elements toward the held plurality of tubes of equal number as the openings in said elements whereby said tubes will be inserted through the respective openings of all of said elements.

10. In a machine for making radiator elements, in combination with means to fabricate radiator elements from a strip of blank material, means to intermittently advance the strip of material to said fabricating means, and means to receive the elements from said fabricating means and to force them upon another element, said receiving means being located below said fabricating means and in a plane parallel to the plane of the strip of material.

11. In a machine for making radiator units, in combination with means to fabricate a radiator element from a strip of blank material, means to intermittently advance the strip of material under said fabricating means, and means to receive the elements from said fabricating means and to force them upon another element of said radiator unit, said receiving means being located below said fabricating means and in a plane parallel to the plane of the strip of material, and means to move the element receiving means in timed relation with said strip advancing means.

12. In a machine for the purpose described, means to fabricate a radiator element from a strip of blank material, said means comprising a series of reciprocating punches and a series of stationary dies, means for intermittently feeding the strip of material between said punches and dies, means associated with said punches to control the intermittent action of said strip feeding means, means to receive the fabricated elements located beneath said dies and intermittently movable in a horizontal plane, in a direction at right angles to the direction of travel of this strip, means to guide the fabricated elements towards said receiving means, means to intermittently advance the element receiving means in timed relation with said strip feeding means, and power transmitting means for controlling certain of said movable means.

13. In a machine for the purpose described, means to fabricate a radiator element from a strip of blank material, said means comprising a series of reciprocating punches and a series of stationary dies, means for intermittently feeding the strip of material between said punches and dies, means associated with said punches to control the intermittent action of said strip feeding means, means to receive the fabricated elements located beneath said dies and intermittently movable in a horizontal plane in a direction at right angles to the direction of travel of this strip, means to guide the fabricated elements towards said receiving means, means to intermittently advance the element receiving means in timed relation with said strip feeding means, means associated with and controlled by said element receiving means to hold another radiator element in proper position to be assembled to the first mentioned element and power transmitting means for controlling certain of said movable means.

14. In a machine for the purpose described, means to fabricate a radiator element from a strip of blank material, said means comprising a series of reciprocating punches and a series of stationary dies, means for intermittently feeding the strip of material between said punches and dies, mean associated with said punches to control the intermittent action of said strip feeding means, means to receive the fabricated elements located beneath said dies and intermittently movable in a horizontal plane in a direction at right angles to the direction of travel of this strip, means to guide the fabricated elements towards said receiving means, means to intermittently advance the element receiving means in timed relation with said strip feeding means, means associated with and controlled by said element receiving means to hold another radiator element in proper position to be assembled to the first mentioned element, means to remove the elements from said machine after the same are assembled, and power transmitting means for controlling certain of said movable means.

15. In a machine for the purpose described, a vertically reciprocating punch holder having a series of punches mounted thereon and co-operating guides for said punches, means for intermittently moving a strip of blank material between said punches and guides, said means controlled in timed relation with said punch holder by said holder, means to receive the fabricated articles, said receiving means including pocketed means to hold a plurality of said articles in spaced relation with each other, means associated with said dies for guiding an article toward the receiving means, means for detachably holding another article, said article adapted to be inserted through the fabricated article, means to intermittently advance the receiving means to force the retained fabricated articles upon the detachably held article and to present an empty pocket to receive each article as fabricated said receiving means adapted to engage a portion of the detachable holding means to release the article held thereon, means to raise the assembled articles from the machine to facilitate removal therefrom, and means to return the emptied receiving means into a position to again receive the fabricated articles.

16. In a machine for the purpose described, power operated means for fabricating a radiator element from a strip of blank material, in combination with means to removably support another radiator element and means to receive and hold the fabricated elements from said fabricating means and to assemble said elements upon the removably supported radiator element while said fabricated elements are held by said receiving means.

17. In a machine for the purpose described, power operated means for fabricating the radiator element from a strip of blank material in combination with means to support another radiator element, means to intermittently feed the strip of blank material, including intermittently openable rolls, means to receive and hold the fabricated elements from said fabricating means, said receiving means being adapted to assemble said elements upon the supported radiator element while said fabricated elements are held thereby, said receiving means including an intermittently movable pocketed rack.

18. In a machine for the purpose described, power operated means for fabricating the radiator element from a strip of blank material in combination with means to intermittently feed the strip of blank material, including intermittently openable rolls, means to receive the fabricated elements and to assemble the same upon another radiator element, including an intermittently movable pocketed rack, and means to remove the assembled elements from said rack.

19. In a machine for the purpose described, power operated means for fabricating the radiator element from a strip of blank material in combination with means to intermittently feed the strip of blank material, including intermittently openable rolls, means to receive the fabricated elements and to assemble the same upon another radiator element, including an intermittently movable pocketed rack, means to remove the assembled elements from said rack, and means to return said rack into proper position to again receive fabricated elements.

20. The method of making radiator units of the type described which comprises fabricating an element of said unit from a strip of blank material, dropping the fabricated element by gravity into a spaced pocketed holder and forcing another element of said unit through an opening in said first mentioned element while similar elements are being fabricated, and removing said other element with said fabricated element assembled thereon bodily from said pocketed holder.

21. The method of making radiator units of the type described which comprises fabricating an element of said unit from a strip of blank material, dropping the fabricated element by gravity into a spaced pocketed holder and forcing another element of said unit through an opening in said first mentioned element while similar elements are being fabricated and dropped into said holder, and removing said other elements with said fabricated element assembled thereon bodily from said pocketed holder.

22. The method of making radiator units of the type described, which comprises fabricating a plurality of elements from a strip of blank material, dropping the fabricated elements into a spaced pocketed holder, forcing another element of said unit through an opening in the first mentioned elements and removing the assembled unit from said pocketed holder.

23. The method of making radiator units which comprises punching an opening in a strip of blank material, forming an irregular surface contour about the opening so made, shearing a portion of said strip including the opening and the irregular surface contour about the opening from said strip, dropping the sheared portion into a container, holding the portion so dropped in proper position in the container to allow the insertion of a previously supplied element of the radiator unit through the opening, removing the portion from the container while upon the element and permanently securing the portion upon the element by dipping the assembled unit in molten solder.

24. The method of making radiator units, which comprises punching a series of openings in a strip of blank material, shearing a portion of said strip including the openings from said strip, dropping the sheared portion into a container, holding the portion in proper position in the container to allow the insertion of previously supplied elements of equal number as such openings, through the openings, removing the portion from the container with the elements inserted therethrough and permanently securing the elements in said portion by dipping the assembled unit in molten solder.

25. In a machine for the purpose described, a vertically reciprocating punch holder having a series of punches for fabricating an article mounted thereon and co-operating dies for said punches, means for intermittently moving a strip of blank material between said punches and dies, means to receive the fabricated articles, means for detachably holding another article, said article adapted to be inserted through the fabricated article, means to intermittently advance the receiving means, means to raise the assembled articles from the machine, and power supplying means for moving all of said intermittently movable parts.

26. In a machine for making radiator units, the combination of means for stamping an element of such a unit from blank material, pocketed means for receiving said stamped element, an element support, and means to assemble said stamped element to an element upon said support, each of said means being operable in timed relation to the others.

27. In mechanism for making radiator units, the combination of means for stamping an element of such a unit from blank material, means for automatically receiving said element from said stamping means, and means to assemble said element upon another element of said unit while said first mentioned element is retained by said receiving means, said assembling means including means to support the other element.

28. In a machine for making radiator units, said units comprising a plurality of fins on a tube, the operative combination of means to fabricate the fins, means to collect the fins from said fabricating means, means to force said fins on said tube, and means to raise the assembled tube and fins from the collecting means.

29. In a machine for making radiator units, the operably connected combination of means to fabricate an element of such a unit from an intermittently moving strip of material, means located below the moving strip of material to collect the elements from said fabricating means, said collecting means intermittently movable in a direction substantially at right angles to the direction of movement of the strip.

30. In a machine for making radiator units, the combination of means to fabricate an element of such a unit from an intermittently moving strip of material, means located below the moving strip of material to collect the elements as fabricated, and means to assemble said elements upon another element of such a unit while said first mentioned element is retained in said collecting means, all of said means being operably connected to each other.

31. In combination with means to fabricate an element, means to collect the elements as fabricated and to hold them in spaced relation relative to each other, means to assemble said elements upon another element while the first mentioned elements are retained in said collecting means, a power driven mechanism interconnecting all of said means.

32. In a machine of the type described, the combination of means to fabricate a plurality of articles, means to receive the articles as fabricated, means to assemble said articles, while within said receiving means, upon a plurality of other articles and interconnecting mechanisms between each of said means whereby the operation thereof is substantially automatic.

33. In a machine of the type described, the combination of means to fabricate an article, means to receive said article when fabricated, means to assemble a plurality of other articles with said fabricated article and interconnecting mechanisms between each of said means whereby the operation thereof is substantially automatic.

34. In a machine for making a radiator unit, said unit having a plurality of elements, the combination of means to fabricate an element of said unit, means to receive said element from said fabricating means, and means to remove said element from said receiving means.

35. In a machine of the class described, means to fabricate a radiator element, means operably positioned relatively to said fabricating means and adapted to receive the element when fabricated, and means to hold another radiator element relatively to said receiving means in proper position to be assembled with the first mentioned element.

36. In a machine of the class described, means to fabricate a radiator element, means operably positioned relatively to said fabricating means and adapted to receive the element when fabricated, and means to hold another radiator element relatively to said receiving means in proper position to be assembled with the first mentioned element, and means to release the second mentioned element from said holding means.

37. In a machine of the class described, means to fabricate a plurality of radiator elements, means operably positioned relatively to said fabricating means and adapted to selectively collect the elements when fabricated, means to hold another radiator element relatively to said receiving means in proper position to be assembled with the first mentioned elements, and means to release the second mentioned element from said holding means.

38. In a machine of the class described, means to fabricate a plurality of radiator elements, means operably positioned relatively to said fabricating means and adapted to selectively collect the elements when fabricated, means to hold another radiator element relatively to said receiving means in proper position to be assembled with the first mentioned elements, and means to release the second mentioned element from said holding means when the required number of first mentioned elements are assembled upon the second mentioned elements.

39. A machine for fabricating radiator fins, having movable means including a series of spaced pockets for receiving and holding the fins in an upright position, and means operably associated therewith to assemble said fins upon the tube.

40. In a machine for fabricating radiator fins, means for stamping out a fin from a strip, and means located below the strip provided with a pocket for receiving the stamped-out fin edgewise by gravity from said fabricating means, and means operably associated therewith to assemble said fins upon the tube.

41. In a machine for fabricating radiator fins, means for stamping out fins from a movable strip, pocketed means movable in a plane parallel to the plane of the strip for receiving the finished fins in a series of pockets thereof and means for removing said fins from said pocketed means.

42. In a machine for the purpose described, power operated means for fabricating a radiator element from blank material in combination with means to feed the blank material to said fabricating means, intermittently movable means to receive the fabricated elements one at a time as fabricated, said receiving means during its intermittent movement being adapted to assemble said elements upon another radiator element.

43. A machine for making radiator units, comprising the combination of means to fabricate an element of said unit, means to receive said element from said fabricating means, means to move said receiving means toward another element of said unit to assemble said first mentioned unit thereto, means to hold said other element, means to release said holding means, and means to lift the assembled elements from said receiving means.

44. In a machine for fabricating radiator elements, fabricating means, and means for receiving the elements successively as fabricated and retaining the same in spaced upright relation and means to remove all of said elements substantially simultaneously from said receiving means.

45. In a machine for fabricating radiator fins, means for stamping out a fin from a strip, and means located below the strip provided with a pocket for receiving the stamped-out fin edgewise from said fabricating means and means to remove said fin from said pocket.

46. In a machine of the class described, means to fabricate a plurality of radiator elements, means operable with said fabricating means to receive the elements when fabricated, means to hold another radiator element in position to be assembled with said first mentioned elements, means to release the second mentioned element from said holding means substantially automatically by movement of the element receiving means.

47. The method of making radiator units of the type described, which comprises fabricating a plurality of elements from blank material, feeding the fabricated elements into a pocketed holder, causing another element of said unit to pass through an opening in the first mentioned elements, and removing the assembled unit out of engagement with said pocketed holder substantially automatically.

48. In a machine for making radiator elements or the like, means for fabricating an element including a vertically movable member cooperating with a stationary member, means to receive the element when fabricated, one of said members having means to direct the element toward said receiving means, the other member having means cooperating with said directing means to insure positive action thereof and means to hold another radiator element relatively to said receiving means and in proper position for assembly with said first mentioned element.

49. The method of making radiator units which consists of fabricating an element from a strip of material lying in a horizontal plane, dropping said element by gravity toward a vertically disposed pocket, turning said element from a horizontal to a vertical plane while being dropped, and retaining said element within said pocket while assembling the same upon a tube to form a radiator unit.

50. The method of making a radiator unit which consists of punching an opening in a strip of material, forming a predetermined surface contour about said opening, freeing the portion so formed from said strip, directing said portion toward a pocket, dropping said portion by gravity into said pocket while turning said portion to a plane substantially at right angles to the plane of the strip of material, and assembling another member through said portion while said portion is retained in said pocket.

51. The method of making a radiator unit which consists of fabricating an element from a horizontally disposed strip of material, causing said element to drop toward a pocket while said element is being turned from a horizontal plane to a vertical plane, and assembling said element upon another element while said first mentioned element is retained within said pocket.

52. The method of making radiator units comprising a series of fin-like elements in spaced relation upon a tubular member, which consists of fabricating the fin-like elements, causing the elements to move into a pocketed container as fabricated, holding the elements within said container in spaced relation, and forcing the tubular member through openings in said elements while held in said container.

53. In a machine for making radiators, means for stamping out successively from a strip a plurality of perforated fins, means for feeding the strip to the stamping means, and a pocketed fin-receiving member movable in timed relation with the stamping means and having pockets into which the fins as stamped are delivered edgewise, means to releasably hold another radiator element in position for assembling said fins thereon as said fin receiving member is moved.

54. In a machine for making radiators, means for forming successively from a strip of material a plurality of elements each having a perforation therein and means associated with said forming means and operable in timed relation thereto to force a tube through the perforation in each of said elements as formed to assemble said tube and elements together.

55. In a machine for the purpose described, a vertically reciprocating punch holder having a series of punches for fabricating an article mounted thereon, and cooperating dies for said punches, means to intermittently move a strip of blank material between said punches and dies, means to receive the fabricated articles, means for detachably holding another article, said article adapted to be inserted through the fabricated article, means to intermittently advance the article receiving means, means operable by said receiving means to release said holding means, means to release the assembled articles from the machine, and power operable means for moving said intermittently movable means.

56. In a machine for the purpose described, means to fabricate a radiator element from a strip of blank material, said means including a punch and die reciprocable relatively to each other, means for feeding the strip of material between said punch and die, means to receive the fabricated elements, said receiving means being intermittently movable in a horizontal plane, means to feed the fabricated elements toward said receiving means, means to advance the element receiving means in timed relation with said strip feeding means, means to interrupt the advance of said element receiving means, and power means for controlling certain of said movable means.

57. In a machine for the purpose described, means to fabricate a radiator element having an opening therein from a strip of blank material, means to feed the strip of material to said fabricating means, means to receive the fabricated elements, said receiving means being movable in a horizontal plane, means to feed the fabricated elements toward said receiving means, means to advance the element receiving means in timed relation with said strip feeding means, means to hold another radiator element in alignment with the openings in said first mentioned element and stationary with respect to said element receiving means whereby said first mentioned element will be assembled upon said second mentioned element, and means to stop the advance of the element receiving means when the desired number of first mentioned elements are received thereby.

58. In a machine for the purpose described, means to fabricate a radiator element from a strip of blank material, said means comprising a series of reciprocating punches and a series of stationary dies, means for intermittently feeding the strip of material between said punches and dies, means to receive the fabricated elements located beneath said dies and intermittently movable in a horizontal plane, means to guide the fabricated elements towards said receiving means, means to intermittently advance the element receiving means in timed relation with said strip feeding means, means associated with said element receiving means to hold another radiator element in proper position to be assembled to the first mentioned element and power transmitting means for controlling certain of said movable means.

59. In a machine for the purpose described, means to fabricate a radiator element from a strip of blank material, said means comprising a series of reciprocating punches and a series of stationary dies, means for intermittently feeding the strip of material between said punches and dies, means to receive the fabricated elements located beneath said dies and intermittently movable in a horizontal plane, means to guide the fabricated elements towards said receiving means, means to intermittently advance the element receiving means in timed relation with said strip feeding means, means associated with and controlled by said element receiving means to hold another radiator element in proper position to be assembled to the first mentioned element, means to remove the elements from said machine after the same are assembled, and power transmitting means for controlling certain of said movable means.

60. In a machine for the purpose described, power operated means for fabricating a radiator element from blank material, in combination with means to feed the strip of blank material, means to receive the fabricated elements and to assemble the same upon another radiator element, and means to remove the assembled elements from said receiving means.

61. In a machine for the purpose described, power operated means for fabricating a radiator element from blank material, in combination with means to feed the blank material, means to receive the fabricated elements and to assemble the same upon another radiator element, said receiving means including a movable pocketed rack, means to interrupt the movement of said rack when a desired number of elements have been assembled upon said second mentioned element.

62. In a machine for the purpose described, power operated means for fabricating a radiator element from blank material, in combination with means to feed the blank material, means to receive the fabricated elements and to assemble the same upon another radiator element, said receiving means including a movable pocketed rack, means to interrupt the movement of said rack when a desired number of elements have been assembled upon said second mentioned element, and means to remove the assembled elements from said rack.

63. In a machine for the purpose described, power operated means for fabricating a radiator element from blank material, in combination with means to feed the blank material, means to receive the fabricated elements and to assemble the same upon another radiator element, said receiving means including a movable pocketed rack, means to interrupt the movement of said rack when a desired number of elements have been assembled upon said second mentioned element, and means to remove the assembled elements from said rack, and means to return said rack into proper position to again receive fabricated elements.

64. In mechanism for forming radiator units, the combination of element fabricating means, fabricated element receiving means, means to support another element of said unit, means to assemble the fabricated element to the other element to form said unit, and means to successively operate said fabricating, said receiving and said assembling means.

65. In a machine for fabricating an element of a radiator unit, means to fabricate the element from blank material, means to guide said fabricated elements away from said fabricating means, means to hold a rod-like element engaging member, and means operable in timed relation with said fabricating means to cause engagement of said elements with the element engaging member.

66. In a machine for fabricating an element of a radiator unit, means to fabricate the element from blank material whereby an opening is provided in said element, means to guide said fabricated elements away from said fabricating means, a member adapted to enter the opening in each of said elements, means to support said member, and means operable in timed relation with said fabricating means to thread said member through the opening in each of said elements.

67. In a machine for fabricating an element of a radiator unit, means to fabricate the element from blank material whereby an opening is provided in said element, means to guide said fabricated elements away from said fabricating means, a member adapted to enter the opening in each of said elements, means to support said member, means to receive said elements one at a time as fabricated, said receiving means being operable in timed relation with said fabricating means, to assemble said elements and said member together with the member inserted through the opening in each of said elements.

68. The method of making fin tubing which comprises stamping the individual fins out of the raw material, collecting and assembling said fins in closely adjacent relation as they are stamped out, and then threading the collected and assembled fins in proper relation as a unit upon the tubing.

69. A machine for making radiator units, comprising means to fabricate a plurality of similar elements of said units, means to collect said elements from said fabricating means and to guide and arrange them in groups in which they are in alignment with each other, and means to receive the elements from said collecting means, and element engaging means adapted to subsequently remove the elements as a unit from said collecting means.

70. In a machine for making radiator units, fabricating means adapted to form fin-like elements, means adapted to receive said elements as they are fabricated, means adapted to direct said elements into said receiving means, and means to force another element through said fin-like elements while the latter are in said receiving means.

71. In a machine for making radiator units, fabricating means adapted to form fin-like elements, a pocketed container adapted to receive said elements as they are fabricated, means adapted to cause said elements to move into said pocketed container, and means to force another element through said fin-like elements while the latter are in said container.

In witness whereof, I have hereunto set my hand this 6th day of January, 1925.

DANIEL I. ROGERS.